(12) United States Patent
Borrozino et al.

(10) Patent No.: US 11,308,923 B2
(45) Date of Patent: Apr. 19, 2022

(54) ELECTRONIC DEVICE WITH FACE ORIENTING USER INTERFACE

(71) Applicant: MOTOROLA MOBILITY LLC, Chicago, IL (US)

(72) Inventors: Rodrigo Borrozino, Campinas (BR); Benecio Pereira Goulart, Campinas (BR); Jose Douglas Bertazzoni Zambianco, Campinas (BR); Felipe Pratali, Campinas (BR); Mariane Tiemi Iguti, Campinas (BR); Thomas Ubensee, Campinas (BR); Breno Levi Correa, Campinas (BR); Joao Vinicius Perrucino Campos, Campinas (BR); Wendel Malta De Assis, Campinas (BR); Gabriela De Oliveira Ribas, Campinas (BR); Daniel Fernandes Da Nobrega, Sao Carlos (BR)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/597,085

(22) Filed: Oct. 9, 2019

(65) Prior Publication Data

US 2021/0110794 A1 Apr. 15, 2021

(51) Int. Cl.
| | |
|---|---|
| *G09G 5/38* | (2006.01) |
| *G06T 7/70* | (2017.01) |
| *G09G 5/14* | (2006.01) |
| *G06F 3/01* | (2006.01) |

(Continued)

(52) U.S. Cl.
CPC ............... *G09G 5/38* (2013.01); *G06F 3/012* (2013.01); *G06T 7/70* (2017.01); *G06V 40/10* (2022.01); *G06V 40/161* (2022.01); *G09G 5/14* (2013.01); *G06T 2207/30201* (2013.01); *G09G 2320/068* (2013.01); *G09G 2340/0492* (2013.01); *G09G 2354/00* (2013.01)

(58) Field of Classification Search
None
See application file for complete search history.

(56) References Cited

U.S. PATENT DOCUMENTS

| | | | |
|---|---|---|---|
| 9,576,393 B1 * | 2/2017 | Bethel | ............ G06T 19/00 |
| 10,088,866 B2 | 10/2018 | Braun et al. | |
| 10,585,474 B2 * | 3/2020 | Azam | ............ G06F 3/0304 |

(Continued)

*Primary Examiner* — Kyle Zhai
(74) *Attorney, Agent, or Firm* — Isidore PLLC

(57) ABSTRACT

An electronic device, method, and computer program product enable orienting a user interface on a display device to a detected orientation of a face. The display device presents the user interface in a default display orientation. An image capture device captures an image. A memory contains a display orientation application. A controller is communicatively coupled to the display device, the image capture device, and the memory. The controller executes the display orientation application to enable the electronic device to provide functionality of orienting the user interface. The image captured by the image capture device is received and a face is identified within the image. An orientation of the face is determined relative to the default display orientation of the display device. At least a portion of the user interface is presented on the display device in a second display orientation that correlates to the orientation of the face.

20 Claims, 12 Drawing Sheets

(51) Int. Cl.
*G06V 40/10* (2022.01)
*G06V 40/16* (2022.01)

(56) References Cited

U.S. PATENT DOCUMENTS

| | | | |
|---|---|---|---|
| 2005/0143124 A1* | 6/2005 | Kennedy | H04M 1/576 455/556.1 |
| 2011/0001840 A1* | 1/2011 | Ishii | G06T 1/0007 348/222.1 |
| 2014/0274216 A1* | 9/2014 | Olodort | H04M 3/54 455/566 |
| 2015/0062314 A1* | 3/2015 | Itoh | G09G 5/14 348/55 |
| 2015/0128075 A1* | 5/2015 | Kempinski | G06F 3/013 715/765 |
| 2018/0136823 A1* | 5/2018 | Knoppert | G06F 3/04845 |
| 2019/0286303 A1* | 9/2019 | Hewitt | G06K 9/00604 |

* cited by examiner

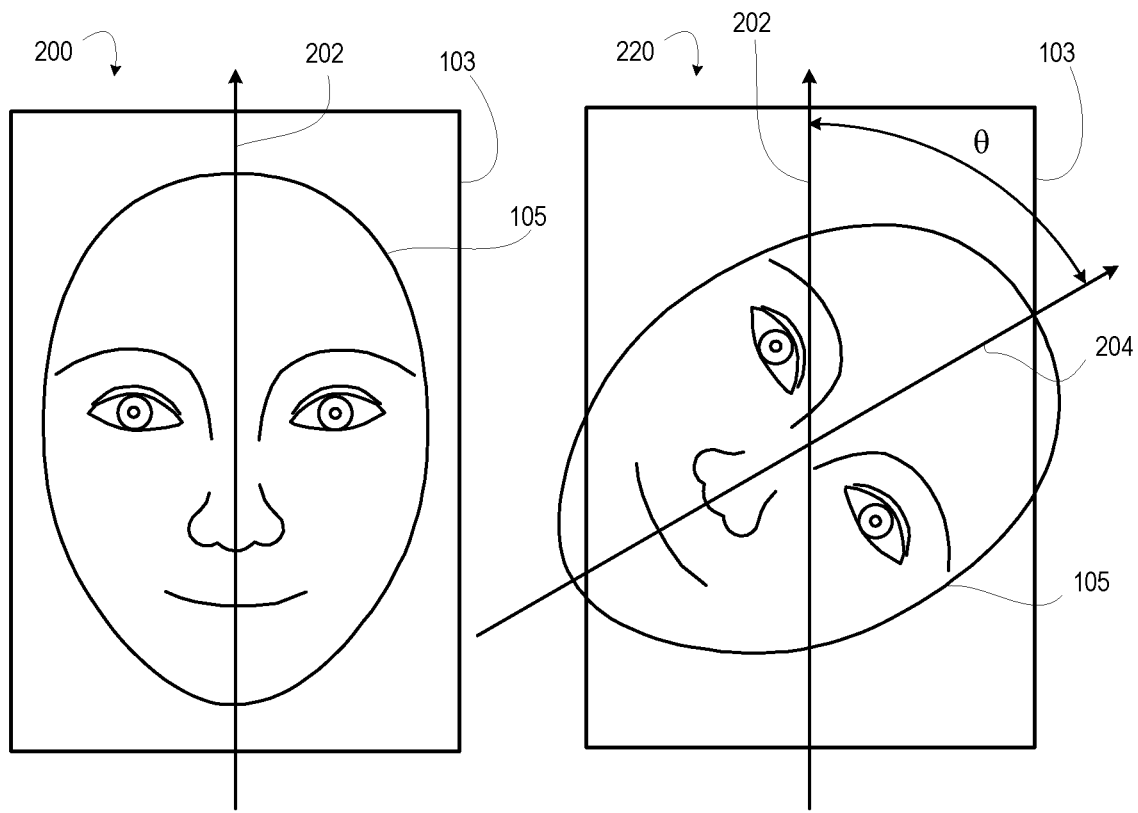
FIG. 2A  FIG. 2B
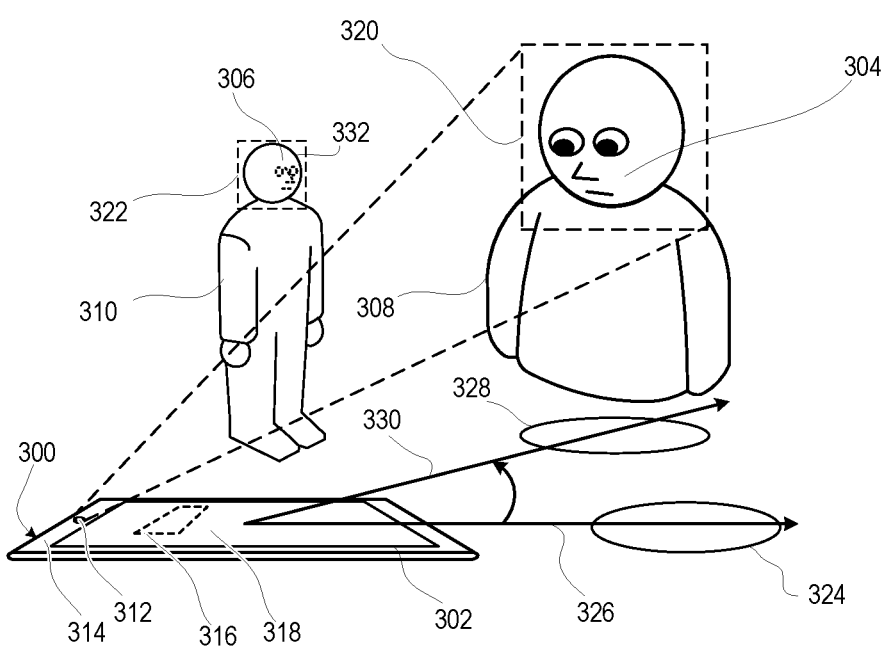
FIG. 3

ELECTRONIC DEVICE WITH FACE ORIENTING USER INTERFACE

TECHNICAL FIELD

The present disclosure relates generally to electronic devices, and in particular to electronic devices capable of orienting a user interface on a display.

DESCRIPTION OF THE RELATED ART

Display devices such as cathode ray tube (CRT) computer monitors were originally built to be oriented with a certain side always being at the top. Content was presented on the display device with the same orientation. The nearly square aspect ratio and significant weight of CRTs provided little incentive to turn the display by 90°. Later advances in display technologies have reduced the weight and power consumption, enabling hand-carried electronic devices with displays to proliferate. Often, electronic devices have a rectangular shape for presenting content in either landscape or portrait mode. User can select a default orientation in one of these modes to better fit content. Electronic devices can include an auto-rotate feature that automatically rotates the content to an orientation that is most nearly upright based on determining the highest side of the display.

With generally known display devices, a user aligns one of the electronic device and the face of the user to the other in order to better comprehend content such as an alphanumeric content of a user interface. With hands free use, the user may not be able to move either his/her face or the electronic device into aligned orientation in a timely manner to have the full benefit of what is being displayed. The user can miss an opportunity to read or understand time critical messages and other information.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 2A is a diagram of an outline of a user interface superimposed on a face of a person that is aligned with a default axis, according to one or more embodiments;

FIG. 2B is a diagram of the outline of the user interface superimposed on the face of the person that is angularly offset, according to one or more embodiments;

FIG. 3 is a three-dimensional diagram of an electronic device having a horizontally positioned display device and that detects and selectively responds to faces of two persons, according to one or more embodiments;

DETAILED DESCRIPTION

Figure 1:
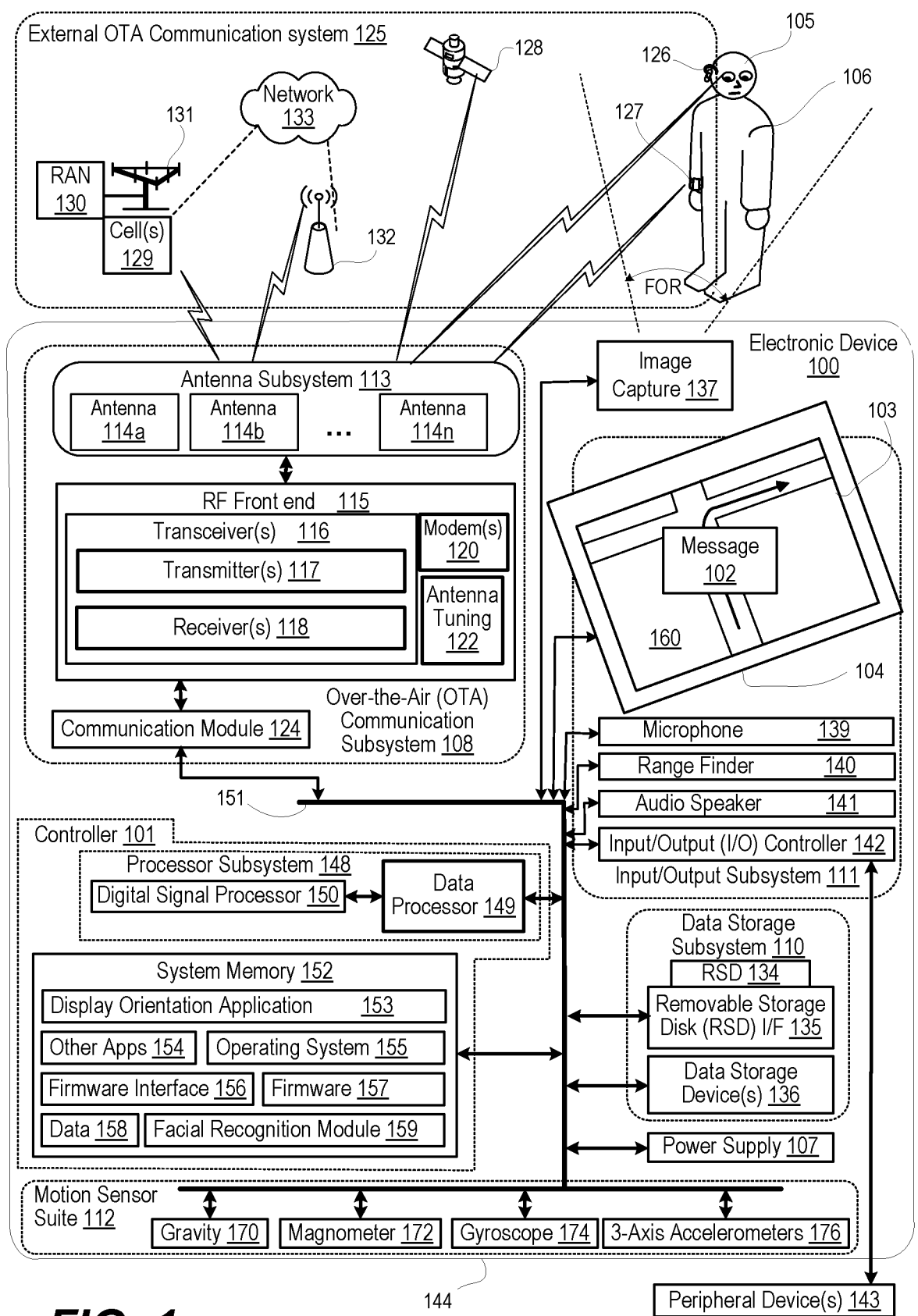
FIG. 1 is a functional block diagram of an electronic device that orients a user interface on a display device to align with a detected orientation of a face of a person, according to one or more embodiments.

According to aspects of the present disclosure, an electronic device, a method, and a computer program product enable orienting a user interface on a display device to a detected orientation of a face. The display device can present the user interface in a default display orientation as a first display orientation. An image capture device captures an image from a field of regard (FOR) of the display device. The FOR of the image capture device is sufficient to capture angles and distances to the display from which the display device is humanly viewable and readable. A memory contains a display orientation application. A controller is communicatively coupled to the display device, the image capture device, and the memory. The controller executes the display orientation application to enable the electronic device to provide functionality of orienting the user interface. The image captured by the image capture device is received and a face is identified within the image. An orientation of the face is determined relative to the default display orientation of the display device. At least a portion of the user interface is presented on the display device in a second display orientation that correlates to the orientation of the face.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention.

The description of the illustrative embodiments can be read in conjunction with the accompanying figures. Embodiments incorporating teachings of the present disclosure are shown and described with respect to the figures presented herein.

FIG. 1 is a functional block diagram of example electronic device 100 within which the features of the present disclosure are advantageously implemented. In the illustrated embodiment, electronic device 100 has controller 101 that orients at least first portion ("message") 102 of user interface 103 on display device 104 to align with a facial orientation of face 105 of person 106. Electronic device 100 can be one of a host of different types of devices, including but not limited to, a mobile cellular phone, satellite phone, or smart-phone, a laptop, a net-book, an ultra-book, a networked smart watch or networked sports/exercise watch, and/or a tablet computing device or similar device that can include wireless communication functionality. As a device supporting wireless communication, electronic device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem. These various devices all provide and/or include the necessary hardware and software to support the various wireless or wired communication functions as part of a communication system. Electronic device 100 can be intended to be portable, hand-held, wearable, detachable, positioned in a fixed location, or mounted to a movable vehicle.

Referring now to the specific component makeup and the associated functionality of the presented components. In one or more embodiments, electronic device 100 includes controller 101, over-the-air (OTA) communication subsystem 108, data storage subsystem 110, input/output subsystem 111, and motion sensor suite 112. OTA communication subsystem 108 includes antenna subsystem 113 having antenna elements 114a-114n. OTA communication subsystem 108 includes frontend 115 having transceiver(s) 116 that includes transmitter(s) 117 and receiver(s) 118. Frontend 115 further includes modem(s) 120 and antenna tuning circuitry 122. OTA communication subsystem 108 includes communication module 124. OTA communication subsystem 108 communicates with external OTA communication system 125. External OTA communication system 125 can include devices such as wireless headset 126 and smart watch 127. External communication system 125 can include global positioning system (GPS) satellites 128, cell(s) 129 of RANs 130 that transmit and receive via radio tower 131, node 132, and networks 133.

Data storage subsystem 110 of electronic device 100 includes removable storage device (RSD) 134, RSD interface (I/F) 135, and data storage device(s) 136. In one or more embodiments, removable storage device (RSD) 134, which is received in RSD interface 135, is a computer program product or computer readable storage device, which can be referred to as non-transitory. RSD 134 can be accessed by controller 101 to provision electronic device 100 with program code. When executed by controller 101, the program code provides the functionality described herein within electronic device 100. I/O subsystem 111 includes image capture device 137, display device 104, microphone 139, range finder 140, audio speaker 141, and I/O controller 142 that connects to peripheral devices 143 external to housing 144 of electronic device 100.

Controller 101 includes processor subsystem 148 that includes one or more central processing units (CPUs) ("data processor") 149 that are communicatively coupled, via system interlink 151, to system memory 152. Processor subsystem 148 can include one or more digital signal processors 150 that are integrated with data processor 149 or are communicatively coupled, via system interlink 151, to data processor 149. System memory 152 includes applications such as display orientation application 153 and other application(s) 154. System memory 152 further includes operating system 155, firmware interface (I/F) 156, such as basic input/output system (BIOS) or Uniform Extensible Firmware Interface (UEFI), and other firmware 157. System memory 152 includes data 158 used by display orientation application 153 and other applications 154. Facial recognition module 159 can also reside at least in part in system memory 152.

Processor subsystem 148 of controller 101 executes program code to provide operating functionality of electronic device 100. These software and/or firmware modules have varying functionality when their corresponding program code is executed by processor subsystem 148 or secondary processing devices within electronic device 100. Processor subsystem 148 of controller 101 can execute program code of display orientation application 153 to orient at least first portion ("message") 102 of user interface 103 on display device 104 to align with a facial orientation of face 105 of person 106. Controller 101 controls the various functions and/or operations of electronic device 100. These functions and/or operations include, but are not limited to including, application data processing, communication with other electronic devices, navigation tasks, and signal processing. In one or more alternate embodiments, electronic device 100 may use hardware component equivalents for application data processing and signal processing. For example, electronic device 100 may use special purpose hardware, dedicated processors, general purpose computers, microprocessor-based computers, micro-controllers, optical computers, analog computers, dedicated processors and/or dedicated hard wired logic.

In one or more embodiments, controller 101 of electronic device 100 is communicatively coupled via system interlink 151 to OTA communication subsystem 108, data storage subsystem 110, input/output subsystem 111, and motion sensor suite 112. System interlink 151 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (interlink 151) are illustrated in FIG. 1, it is to be understood that more, fewer, or different interconnections may be present in other embodiments.

Communication module 124 of OTA communication subsystem 108 operates in baseband frequency range to encode data for transmission and decode received data, according to a communication protocol. Modem(s) 120 modulate baseband encoded data from communication module 124 onto a carrier signal to provide a transmit signal that is amplified by transmitter(s) 117. Modem(s) 120 demodulates the received signal from cell(s) 129 or node 132 detected by antenna subsystem 113. The received signal is amplified and filtered by receiver(s) 118, which demodulate received encoded data from a received carrier signal. Antenna tuning circuitry 122 adjusts antenna impedance of antenna subsystem 113. Antenna tuning circuitry 122 improves antenna efficiency at desired transmit or receive frequencies of transmitter(s) 117 and receiver(s) 118, respectively, within transceiver(s) 116. Antenna tuning circuitry 122 is electrically coupled to antenna subsystem 113 and compensates for any lossy dielectric effect of being proximate to person 106. In one or more embodiments, antenna subsystem 113 includes multiple antenna elements 114a-114n that are individually tuned to selected RF bands to support different RF communication bands and protocols. Antenna elements 114a-114n can be used in combination for multiple input multiple output (MIMO) operation for beam steering and spatial diversity.

In one or more embodiments, controller 101, via OTA communication subsystem 108, performs multiple types of OTA communication with external OTA communication system 125. OTA communication subsystem 108 can communicate via Bluetooth connection with one or more personal access network (PAN) devices, such as wireless headset 126 and smart watch 127. Communication via Bluetooth connection includes both transmission and reception via a Bluetooth transceiver device. In one or more embodiments, OTA communication subsystem 108 communicates with one or more locally networked devices via a wireless local area network (WLAN) link provided by node 132. Node 132 is connected to wide area network 133, such as the Internet. In one or more embodiments, OTA communication subsystem 108 communicates with GPS satellites 128 to obtain geospatial location information. In one or more embodiments, OTA communication subsystem 108 communicates with RANs 130 having respective base stations (BSs) or cells 129. RANs 130 are a part of a wireless wide area network (WWAN) that is connected to wide area network 133.

Data storage subsystem 110 provides nonvolatile storage that is accessible by controller 101. For example, data storage subsystem 110 can provide a large selection of other applications 154 that can be loaded into system memory 152. In one or more embodiments, local data storage device(s) 136 includes hard disk drives (HDDs), optical disk drives, solid state drives (SSDs), etc.

I/O subsystem 111 includes external and embedded input and output devices. Image capture device 137, such as an optical or infrared camera, can capture an image of face 105 of person 106 and other image data and can detect a gesture made by person 106. Image capture device 137 generates still images and video. In one or more embodiments, images are taken by image capture device 137 from a field of regard (FOR) that is sufficient for facial recognition module 159 to detect face 105 of person 106 that is within an angle and distance to be able to humanly see user interface 103 on display device 104. FOR is the total area that can be captured by a movable sensor. Field of view (FOV) is the angular cone perceivable by the sensor (i.e., image capture device 137) at a particular time instant. Display device 104 can include a touch screen interface that enables touch controls. Display device 104 can display more than one portion of user interface 103 that can be independently oriented. First portion 102 of user interface 103 is a foreground message that is oriented in alignment with face 105 of person 106. Second portion 160 of user interface 103 is a background moving map that is left in a default orientation.

Microphone 139 receives user audible inputs. Range finder 140 emits a waveform of energy, such as acoustic, infrared, RF, etc., whose time of flight is used to measure distance to a reflecting object. Audio speaker 141 provides audio output, including audio playback and alerts. In one or more embodiments, I/O controller 142 connects to one or more peripheral devices 143 that can include/provide additional I/O functionality. I/O controller 142 can also interface to a wired local access network (LAN) (not shown).

Axes-based motion sensor suite 112 includes one or more sensors that individually or in combination indicate orientation of electronic device 100. In one or more embodiments, gravity sensor 170 can be used to measure relative orientation with respect to the Earth's gravitational field. Magnetometer 172 is configured to measure strength and direction of a magnetic field in space that indicate direction relative to the magnetic geographic cardinal coordinates north, east, south and west. Gyroscope 174 is configured to generate and provide sensor data that indicates orientation of electronic device 100 along three X-Y-Z axes based on rotation or angular momentum of electronic device 100 around the multiple axes. Three-axis accelerometer 176 is configured to generate and provide sensor data that indicates acceleration that electronic device 100 is experiencing relative to freefall, which can be used to determine orientation of electronic device 100 along the three axes, based on linear motion and gravity. Gravity sensor 170, magnetometer 172, gyroscope 174, and accelerometer 176 can be used alone or in combination to determine the relative orientation of electronic device 100 in space, including azimuth, pitch, and roll with respect to magnetic north and with respect to the horizontal and vertical axes relative to the direction of gravity.

Electronic device 100 receives electrical power from power supply 107 such as a battery for mobile use or alternating current-direct current (AC-DC) converter for stationary use. Power supply 107 can be communicatively coupled to system interlink 151. Certain functions of electronic device 100 can be responsive to operating on battery power by switching to power conserving modes of operation.

In one or more embodiments, facial recognition module 159 of electronic device 100 receives an image captured by image capture device 137. Facial recognition module 159 identifies face 103 of person 106 within the image. Controller 101 receives: (i) first portion 102 of user interface 103; (ii) second portion 160 of user interface 103; and (iii) facial identification data from facial recognition module 159. Controller 101 determines, based on the facial identification data, an orientation of face 105 relative to a default display orientation of display device 104. FIG. 2A depicts a diagram 200 of an outline of user interface 103 that is presented on display device 104 (FIG. 1) and that is superimposed on face 105. Both user interface 103 and face 105 are aligned with default axis 202. Default display orientation is referred to as a first display orientation, which in this instance is in portrait mode. Orientation of face 105 is referred to as a second display orientation, which in this instance includes no angular offset. FIG. 2B depicts a diagram 220 of the outline of user interface 103 that is presented on display device 104 (FIG. 1) and that is aligned with vertical axis 202 and superimposed on face 105. Face 105 is angularly offset by angle θ to facial axis 204. Returning to FIG. 1, controller 101 presents (i.e., outputs/displays) first portion 102 of user interface 103 on display device 104 in the second display orientation. The second display orientation correlates to the orientation of face 105. Controller 101 presents second portion 160 of user interface 103 on display device 104 in the first display orientation that correlates to the orientation of face 105.

FIG. 3 depicts a three-dimensional diagram of electronic device 300 having rectangular display device 302 that is horizontally positioned. Electronic device 300 detects and selectively responds to faces 304, 306 of two persons 308, 310. Image capture device 312 of electronic device 300 is centered along default top side of bezel 314 that surrounds rectangular display device 302. In one or more embodiments, controller 316 of electronic device 300 determines that two or more faces, first face 304 and second face 306, can view user interface 318 of electronic device 300. Controller 316 can determine distance to persons 308, 310 based on range finding by range finder 140 (FIG. 1). Controller 316 can determine distance based on dimensions of faces 304, 306 in images 320, 322 provided by facial recognition module 159 (FIG. 1). In response to identifying a closer face, such as first face 304, controller 316 can orient user interface 318 to facial orientation of first face 304 and not second face 306. A first position 324 is aligned with default display orientation along axis 326, although offset from a perpendicular viewing angle. In second position 328, person 308 is not aligned with default display orientation along axis 326. Person 308 is aligned with offset axis 330 and displaced from a perpendicular viewing angle. Controller 316 compensates for the facial orientation. In one or more embodiments, controller 316 also compensates for distortion caused by non-perpendicular viewing.

In one or more embodiments, due to lighting conditions or resolution capability of image capture device 312, facial recognition module 159 (FIG. 1) can fail to detect face 304 but can detect head 332 of person 310. Using an assumption that face 304 is vertically oriented, controller 316 can determine facial orientation based on sensing orientation of electronic device 300, relative orientation of head 332 to rectangular display device 302, and a vertical reference. Controller 316 determines orientation of electronic device 300 and a vertical reference using axes-based motion sensor suite 112 (FIG. 1). Controller 316 determines relative orientation of head 332 to rectangular display device 302 using one or more of range finder 140 (FIG. 1) and image capture device 312.

Figure 4:
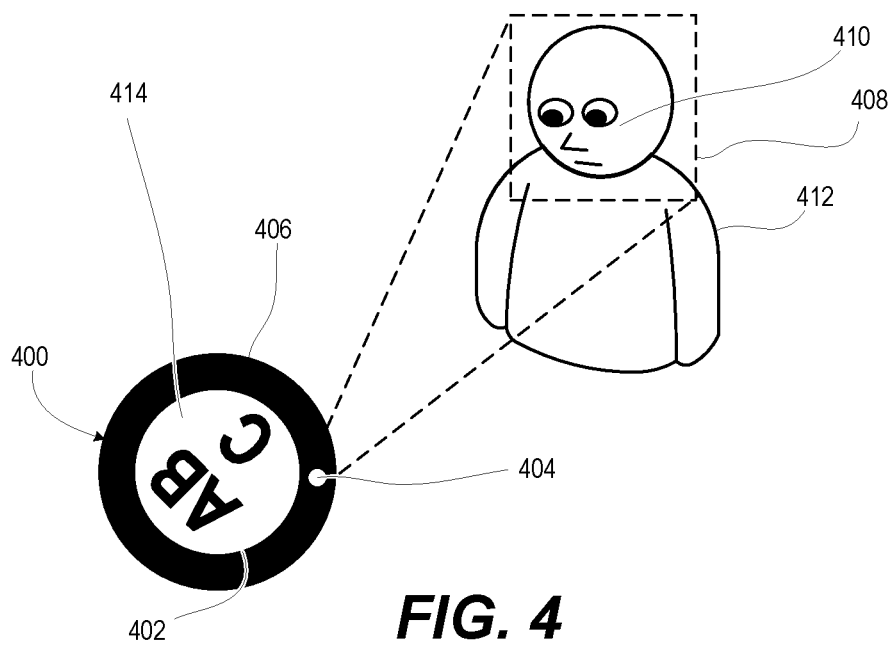
FIG. 4 is a three-dimensional view of an electronic device having a round display device and that detects and responds to a face of a person at an 11 o'clock position, according to one or more embodiments.
Figure 5:
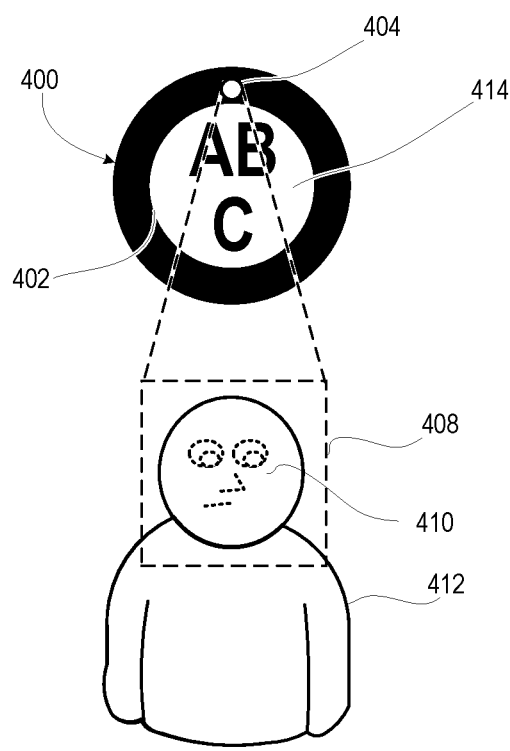
FIG. 5 is a three-dimensional view of the electronic device of FIG. 4 detecting and responding to the face of the person at a 6 o'clock position, according to one or more embodiments.
Figure 6:
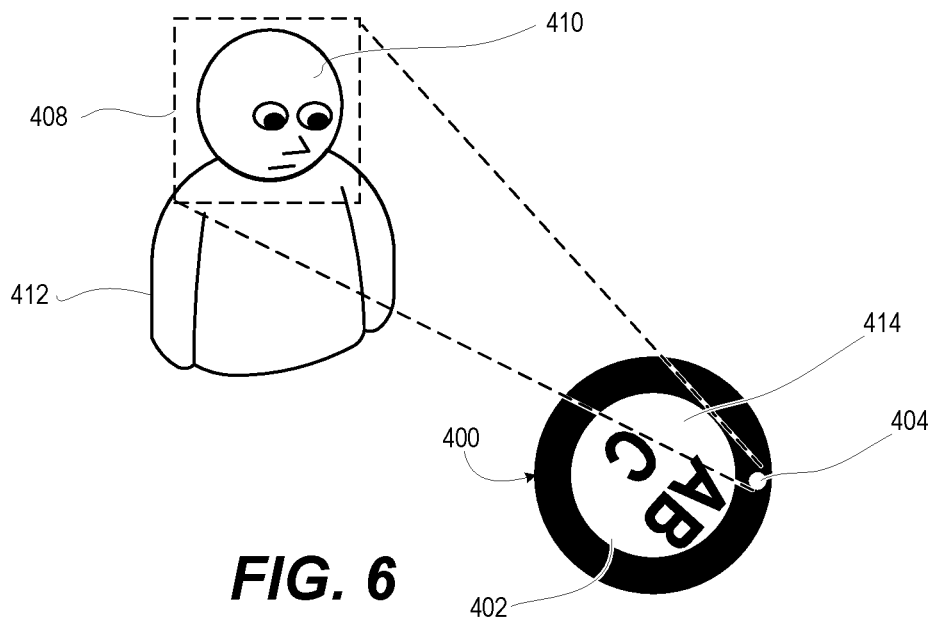
FIG. 6 is a three-dimensional view of the electronic device of FIG. 4 detecting and responding to the face of the person at an 8 o'clock position, according to one or more embodiments.

FIG. 4 depicts a three-dimensional view of electronic device 400, such as a smartwatch, that has round display device 402. Image capture device 404 of electronic device 400 is centered along default top side of bezel 406 that encompasses round display device 402. Electronic device 400 is similar to, and includes similar components as, electronic device 100 (FIG. 1). Using image capture device 404 to capture image 408, controller 101 (FIG. 1) detects face 410 of person 412 at an 11 o'clock position relative to electronic device 400. Controller 101 (FIG. 1) responds by rotating user interface 414 on round display device 402 to align with face 410. FIG. 5 depicts a three-dimensional view of electronic device 400 detecting face 410 of person 412 at a 6 o'clock position. Controller 101 (FIG. 1) responds by rotating user interface 414 on round display device 402 to align with face 410, which happens to be the default display orientation. FIG. 6 depicts a three-dimensional view of electronic device 400 detecting face 410 of person 412 at an 8 o'clock position. Controller 101 (FIG. 1) responds by rotating user interface 414 on round display device 402 to align with face 410.

Figure 7:
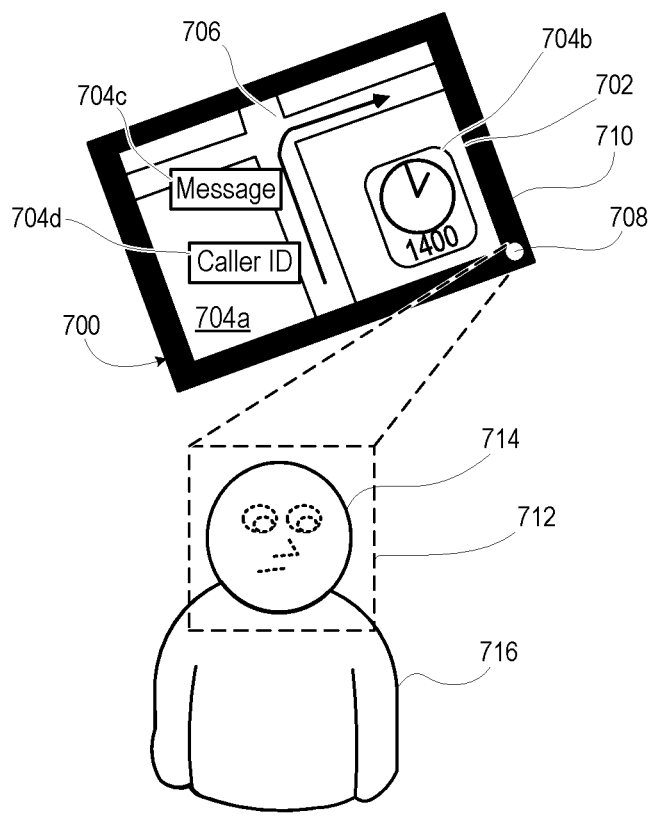
FIG. 7 is a three-dimensional view of an electronic device having a rectangular display device that separately aligns multiple portions of a user interface, according to one or more embodiments.

FIG. 7 depicts a three-dimensional view of electronic device 700 having rectangular display device 702 that separately aligns multiple portions 704a-704d of user interface 706. First portion 704a is a background moving map object. Second portion 704b is a foreground time widget. Third portion 704c is a foreground text message. Fourth portion 704d is a foreground communication session dialog box. Image capture device 708 of electronic device 700 is positioned at a right bottom corner of bezel 710 that encompasses rectangular display device 702. Using image capture device 708 to capture image 712, controller 101 (FIG. 1) detects face 714 of person 716 at a 7 o'clock position relative to electronic device 700. Controller 101 (FIG. 1) responds by leaving first and second portions 704a-704d of user interface 706 in default orientation. Controller 101 (FIG. 1) further responds by orienting third and fourth portions 704c, 704d of user interface 706 on rectangular display device 702 to a display orientation that correlates to the orientation of face 714.

Figure 8:
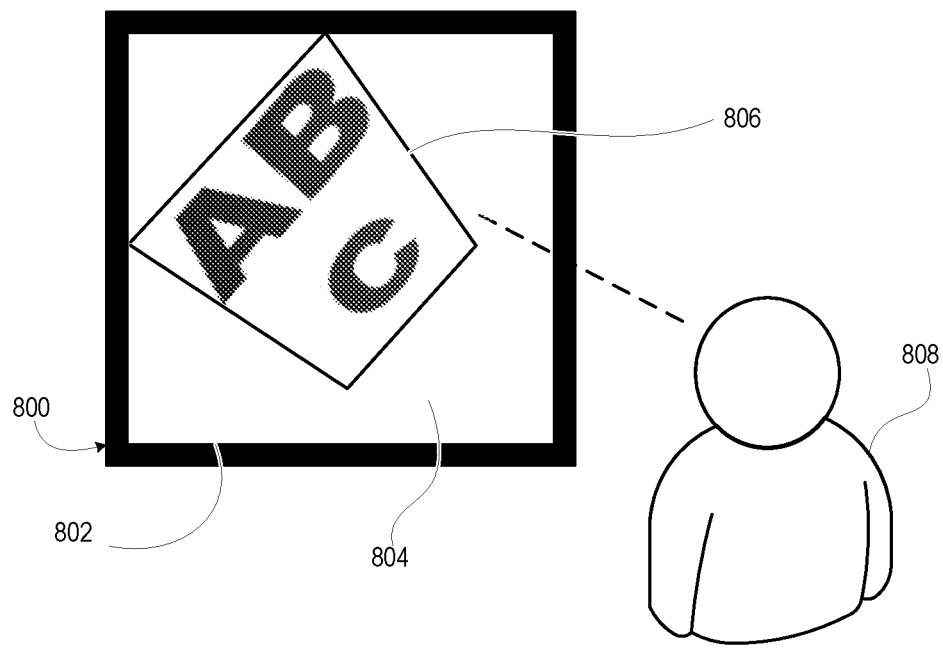
FIG. 8 is a three-dimensional view of a front view of an electronic device having a rectangular display device that creates a reverse perspective user interface to compensate for viewing from an offset angle, according to one or more embodiments.
Figure 9:
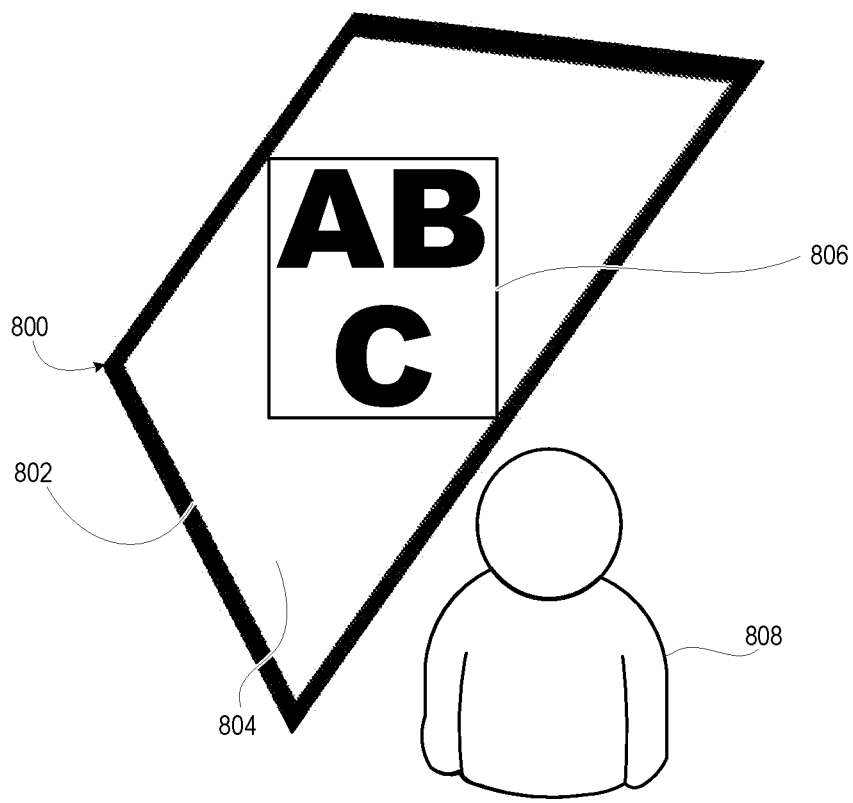
FIG. 9 is a three-dimensional view of the electronic device of FIG. 8, from the perspective of a person at the offset angle, according to one or more embodiments.

FIG. 8 is a three-dimensional view of a front view of electronic device 800 having a rectangular display device 802 that creates user interface 804 with reverse perspective content 806 to compensate for viewing from a non-perpendicular offset angle rather than a straight on perpendicular view. FIG. 9 is a three-dimensional view of the electronic device 800 from the perspective of person 808 at the offset angle which renders content 806 without distortion.

Figure 10:
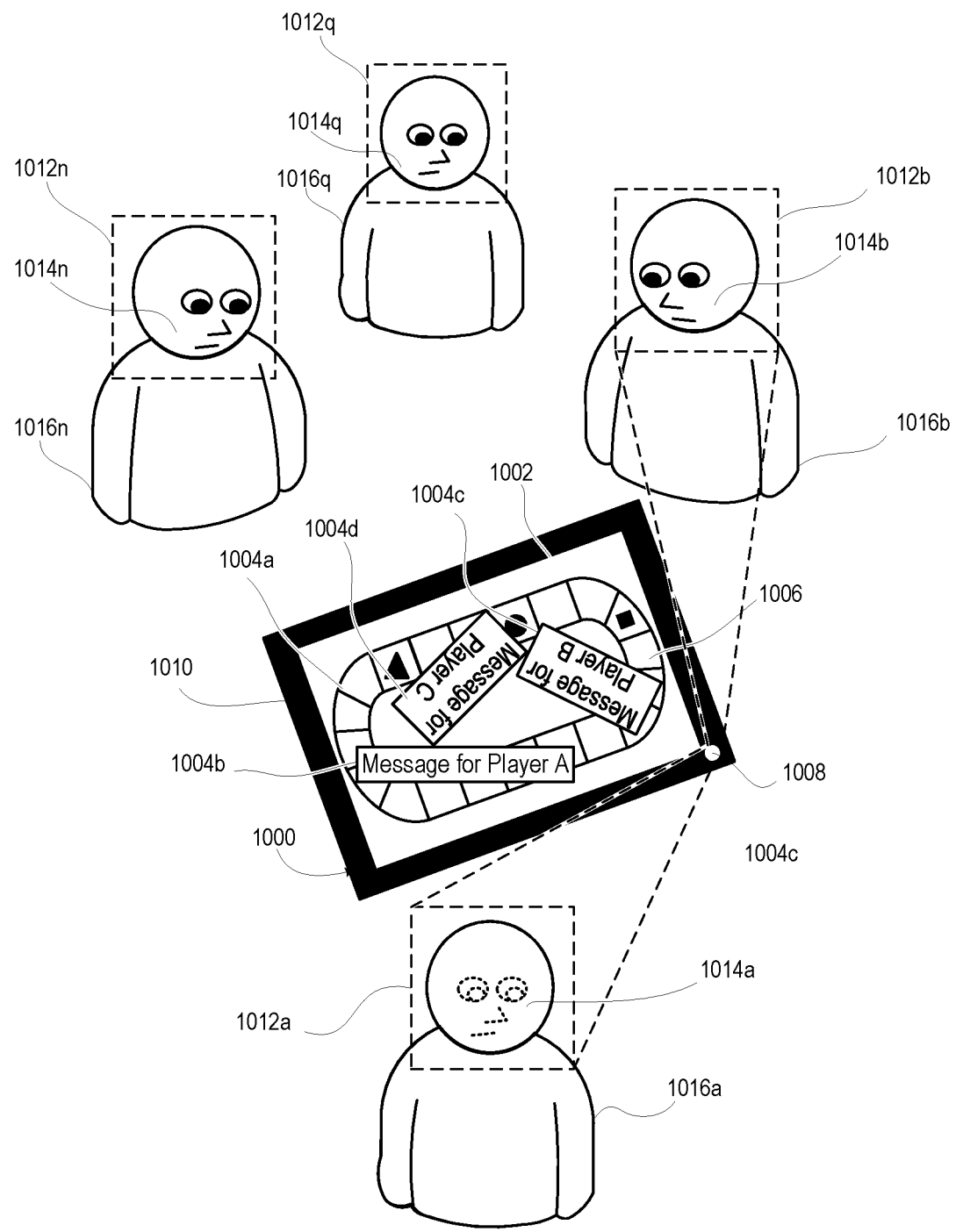
FIG. 10 is a three-dimensional view of an electronic device having a rectangular display device that separately aligns multiple portions of a user interface to align respectively with two or more faces, according to one or more embodiments.

FIG. 10 is a three-dimensional view of electronic device 1000 having rectangular display device 1002 with multiple portions 1004a-d of a user interface 1006 presented in a display orientation that correlates to the orientation respectively with two or more faces. First portion 1004a is a background moving gameboard. Second portion 1004b is a foreground message to player A. Third portion 1004c is a foreground message to player B. Fourth portion 1004d is a foreground message to player C. Image capture device 1008 of electronic device 1000 is positioned at a right bottom corner of bezel 1010 that encompasses rectangular display device 1002. Using image capture device 1008 to capture images 1012a, 1012b, 1012n, 1012q, controller 101 (FIG. 1) detects faces 1014a, 1014b, 1014n, 1014q respectively of first, second, third and fourth persons 1016a, 1016b 1016n, 1016q, at 7 o'clock, 2o'clock, 11 o'clock, and 1 o'clock positions relative to electronic device 1000. The one or more persons can be selected based on one or more factors: (i) closest faces; (ii) stationary faces; (iii) a visually recognized faces; (iv) aurally authenticated faces; (v) assignable players for a game application, etc. Controller 101 (FIG. 1) associates faces 1014a, 1014b, 1014n with three or more persons 1014a, 1014b, 1014n for which portions 1004a-d of a user interface 1006 are individually oriented. Person 1014q is not selected for individually oriented content. Controller 101 (FIG. 1) responds by leaving first portion 1004a of user interface 1006 in default orientation. Controller 101 (FIG. 1) further responds by orienting second portion 1004b of user interface 1006 to align with face 1014a of first person 1016a. Controller 101 (FIG. 1) additionally responds by orienting third portion 1004c of user interface 1006 to align with face 1014b of second person 1016b, which can occur simultaneously with orienting second portion 1004b of user interface 1006 to align with face 1014a of first person 1016a. Controller 101 (FIG. 1) also responds by orienting fourth portion 1004d of user interface 1006 to align with face 1014n of third person 1016n. Controller 101 (FIG. 1) does not orient any portion 1004a d of user interface 1006 to align explicitly with face 1014q of fourth person 1016q.

Figure 11A:
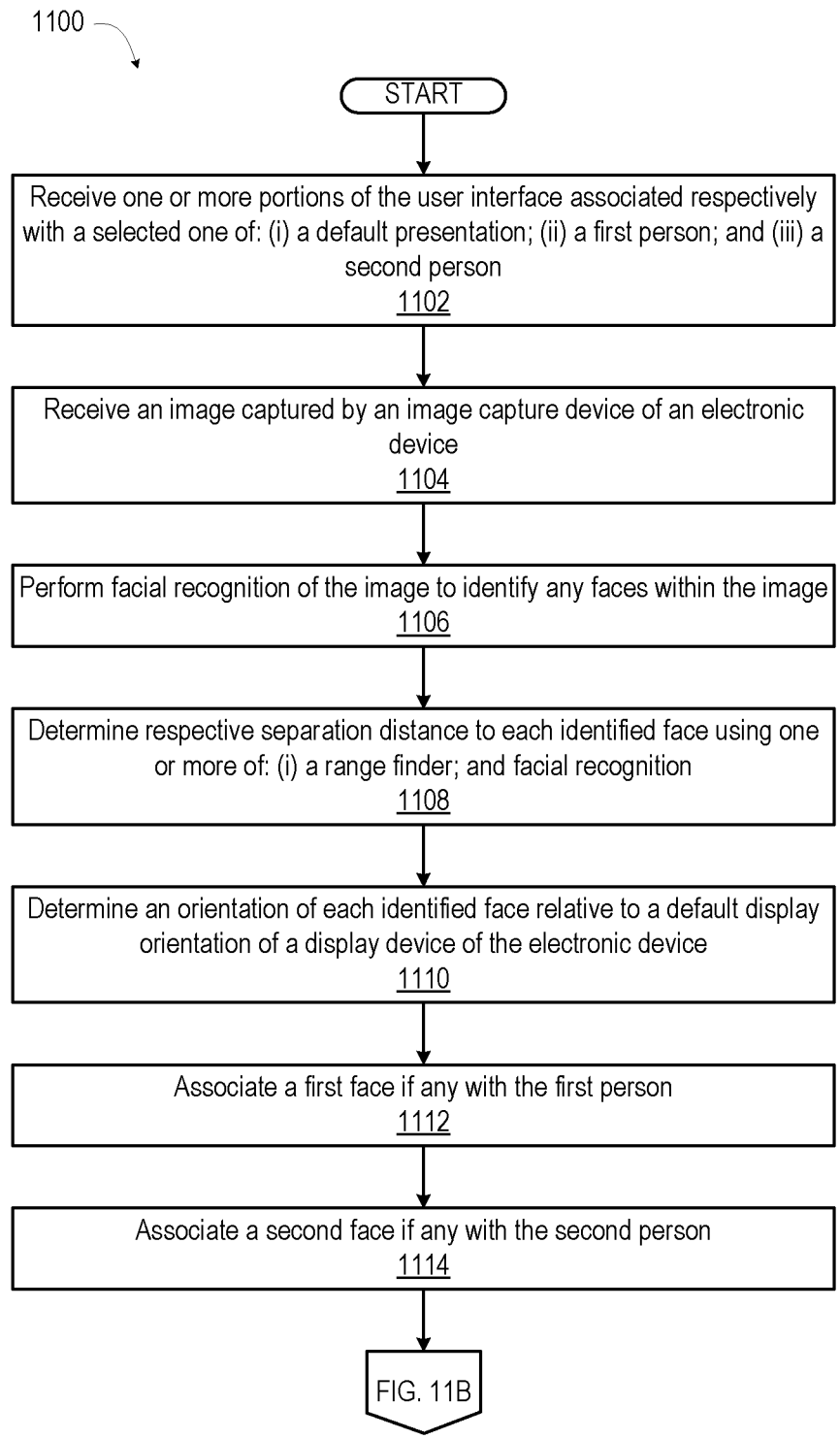
FIGS. 11A-11C present a flow diagram of a method for orienting a user interface on a display device to a detected orientation of a face of a person, according to one or more embodiments.
Figure 11B:
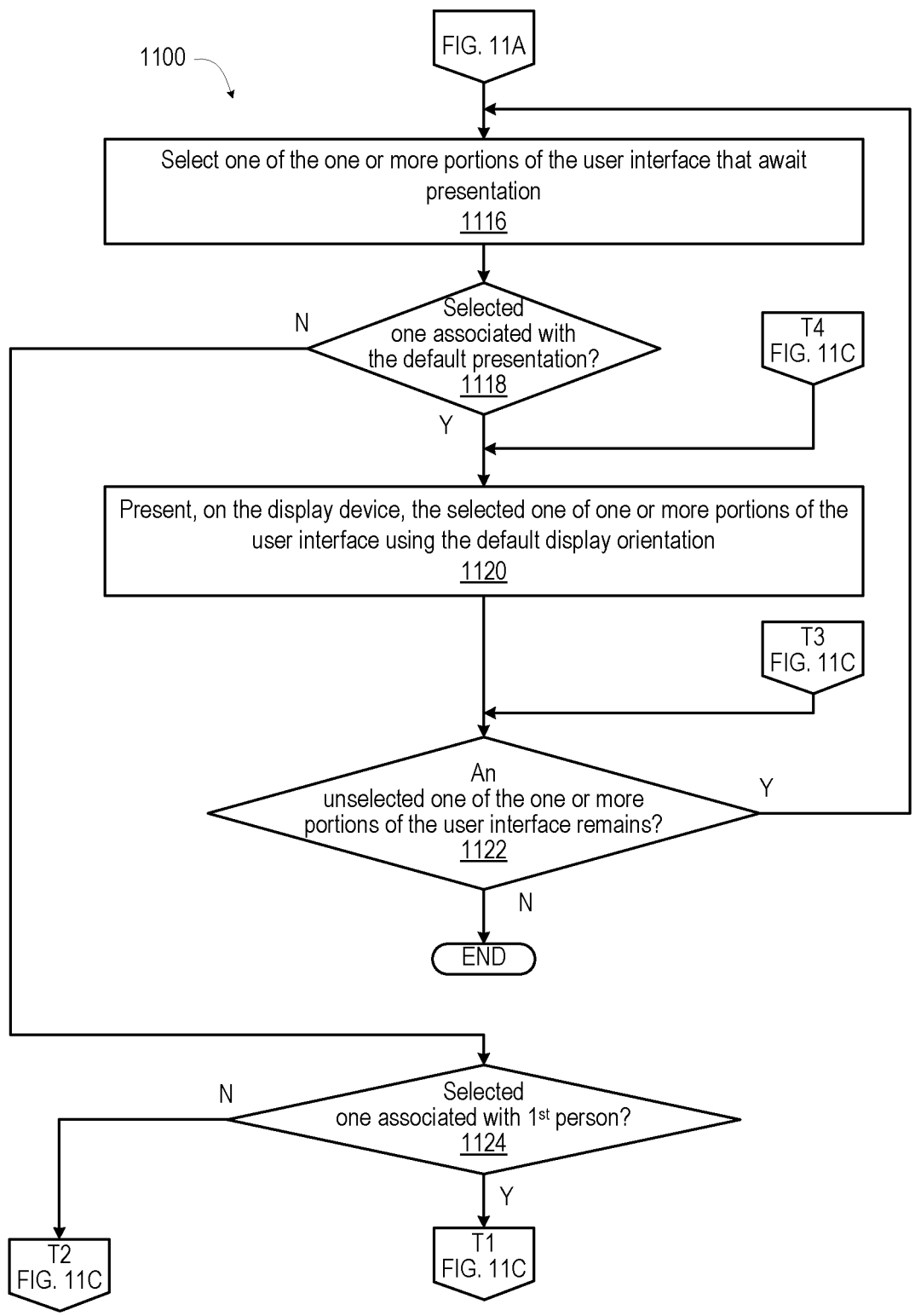
Figure 11C:
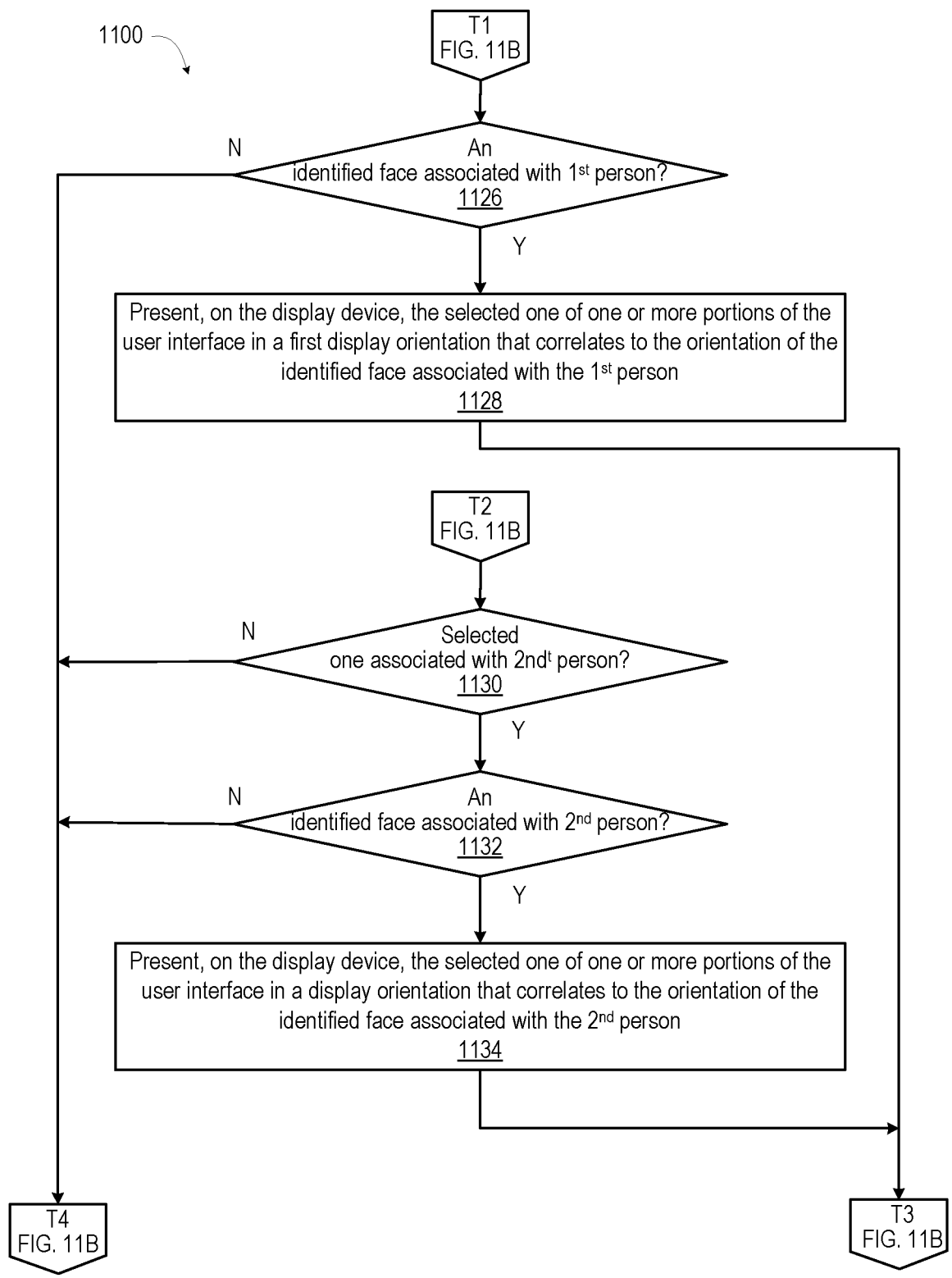

FIGS. 11A-11C present a flow diagram of method 1100 for orienting user interface 103 on display device 104 of electronic device 100 based on a detected orientation of face 105 of person 106 (FIG. 1). In one or more embodiments, controller 101 enables electronic device 100 (FIG. 1) to perform method 1100. With reference to FIG. 11A, method 1100 includes receiving, by the controller of the electronic device, one or more portions of the user interface associated respectively with a selected one of: (i) a default presentation; (ii) a first person; and (iii) a second person (block 1102). Method 1100 includes receiving an image captured by image capture device 137 (FIG. 1) of the electronic device (block 1104). Method 1100 includes performing facial recognition of the image to identify any faces within the image (block 1106). Method 1100 includes determining respective separation distance to each identified face using one or more of: (i) a range finder 140 (FIG. 1); and facial recognition (block 1108). Method 1100 includes determining an orientation of each identified face relative to a default display orientation of a display device of the electronic device (block 1110). Method 1100 includes associating a first face, if any, with the first person (block 1112). Method 1100 includes associating a second face if any with the second person (block 1114). The associations of faces to persons can be based on closest and next closest faces. A randomized selection can be used when an identical distance is determined. The associations of faces to persons can be based on recognizing a face as being identified with a particular one of the first and second person.

Continuing with reference to FIG. 11B, method 1100 includes selecting one of the one or more portions of the user interface (block 1116). A determination is made, in decision block 1118, whether the selected one is associated with the default presentation. In response to determining that the selected one is associated with the default presentation, method 1100 includes presenting, on the display device, the selected one of one or more portions of the user interface using the default display orientation (block 1120). A determination is made, in decision block 1122, whether an unselected one of the one or more portions of the user interface remains. In response to determining that an unselected one of the one or more portions of the user interface remains, method 1100 returns to block 1116. In response to determining that no unselected one of the one or more portions of the user interface remains, method 1100 ends.

In response to determining in decision block 1118 that the selected one is not associated the default presentation, method 1100 includes determining, in decision block 1124, whether the selected one of the one or more portions of the user interface is associated with the first person. Continuing with reference to FIG. 11C, in response to determining that the selected one is associated with the first person, method 1100 includes determining, in decision block 1126, whether an identified face is associated with the first person. In response to determining that an identified face is associated with the first person, method 1100 includes presenting, on the display device, the selected one of one or more portions of the user interface in a first display orientation that correlates to the orientation of the identified face associated with the first person (block 1128). Then method 1100 returns to block 1122. In response to determining that an identified face is not associated with the first person, method 1100 returns to block 1120.

In response to determining that the selected one is not associated with the first person, a determination is made, in decision block 1130, whether the selected one of the one or more portions of the user interface is associated with the second person. In response to determining that the selected one is not associated with the second person, method 1100 returns to block 1120 (FIG. 11B). In response to determining that the selected one is associated with the second person, method 1100 includes determining, in decision block 1132, whether an identified face is associated with the second person. In response to determining that an identified face is associated with the second person, method 1100 includes presenting, on the display device, the selected one of one or more portions of the user interface in a second display orientation that correlates to the orientation of the second face (block 1134). Then method 1100 returns to block 1122 (FIG. 11B). In response to determining that the selected one is not associated with the second person in decision block 1130 or an identified face is not associated with the second person in decision block 1132, method 1100 returns to block 1120 (FIG. 11B).

For clarity, method 1100 includes orienting portions of user interface for two people. In one or more embodiments, method 1100 includes orienting portions of user interface for one person or more than two people. In one or more embodiments, method 1100 includes orienting an entire user interface for one person. The one person can be selected based on one or more factors: (i) a closest face; (ii) a stationary face; (iii) a visually recognized space; and (i) an aurally authenticated face.

Figure 12:
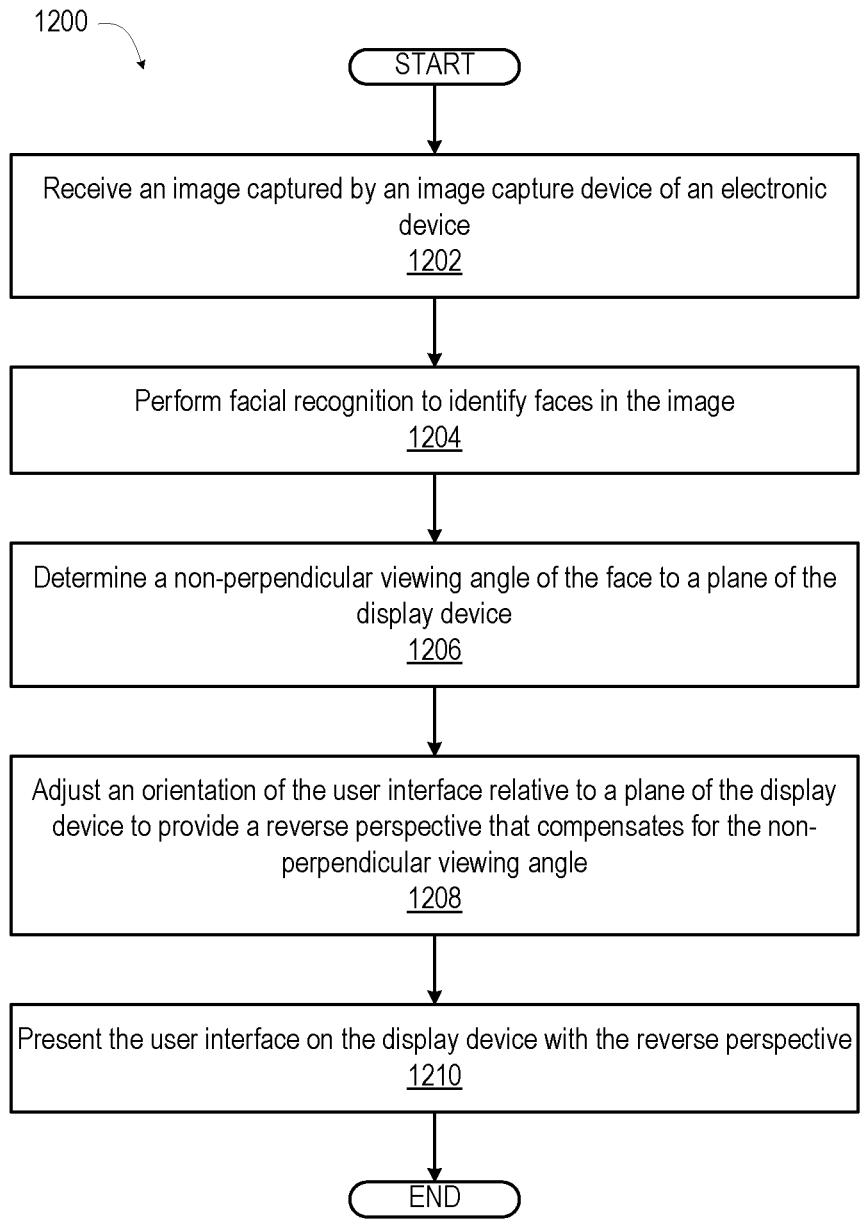
FIG. 12 presents a flow diagram of a method for compensating for distortion due to off-axis viewing of a user interface on a display device, according to one or more embodiments.

FIG. 12 presents a flow diagram of method 1200 for compensating for distortion due to off-axis viewing of user interface 103 on display device 104 of electronic device 100 (FIG. 1). In one or more embodiments, controller 101 enables electronic device 100 (FIG. 1) to perform method 1200. Method 1200 includes receiving an image captured by an image capture device of an electronic device (block 1202). Method 1200 includes performing facial recognition to identify faces in the image (block 1204). Method 1200 includes determining a non-perpendicular viewing angle of the face to a plane of the display device (block 1206). Method 1200 includes adjusting an orientation of the user interface relative to a plane of the display device to provide a reverse perspective that compensates for the non-perpendicular viewing angle (block 1208). Method 1200 includes presenting the user interface on the display device with the reverse perspective (block 1210). Then method 1200 ends.

Figure 13A:
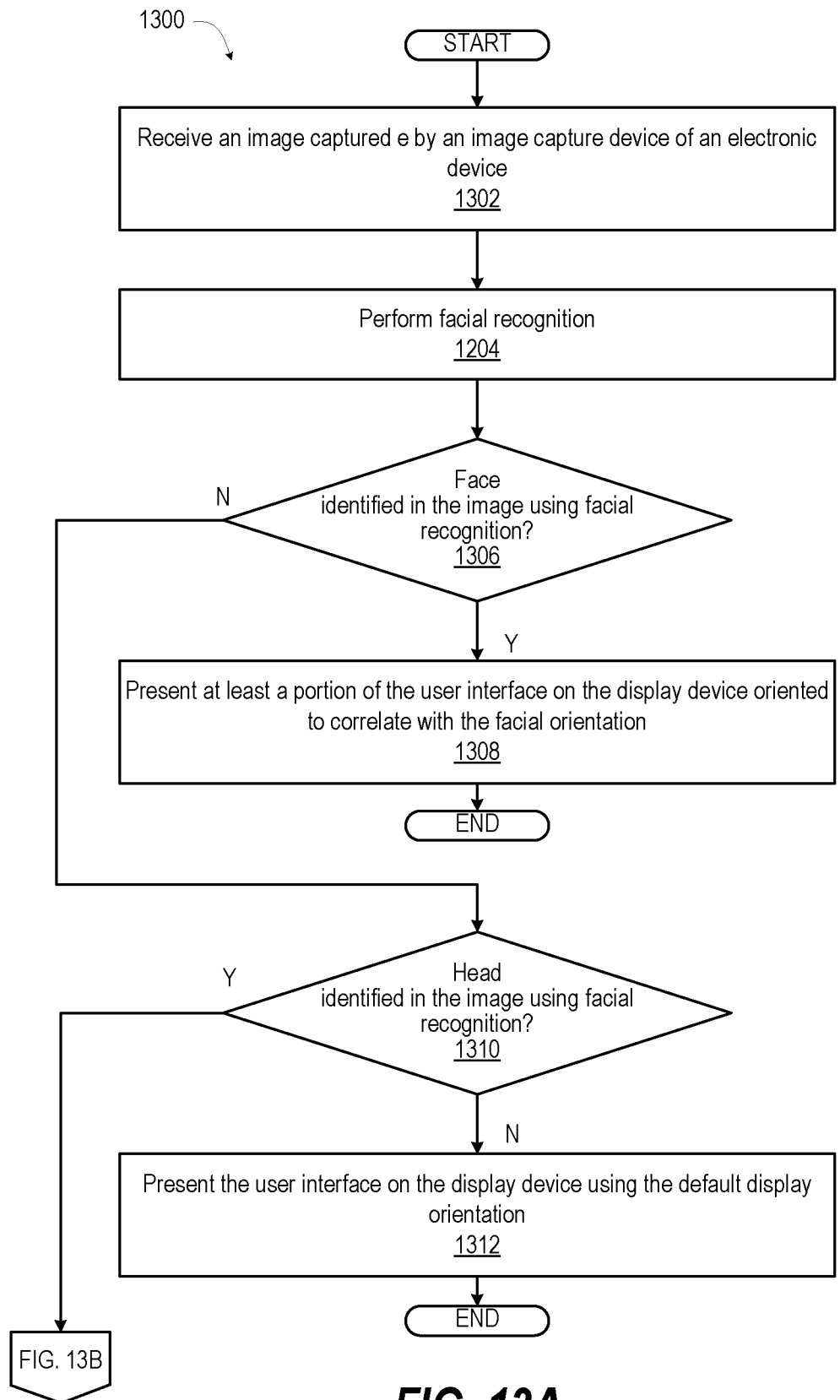
FIGS. 13A-13B present a flow diagram of a method for determining facial orientation with inadequate light or resolution for successful facial recognition, according to one or more embodiments.
Figure 13B:
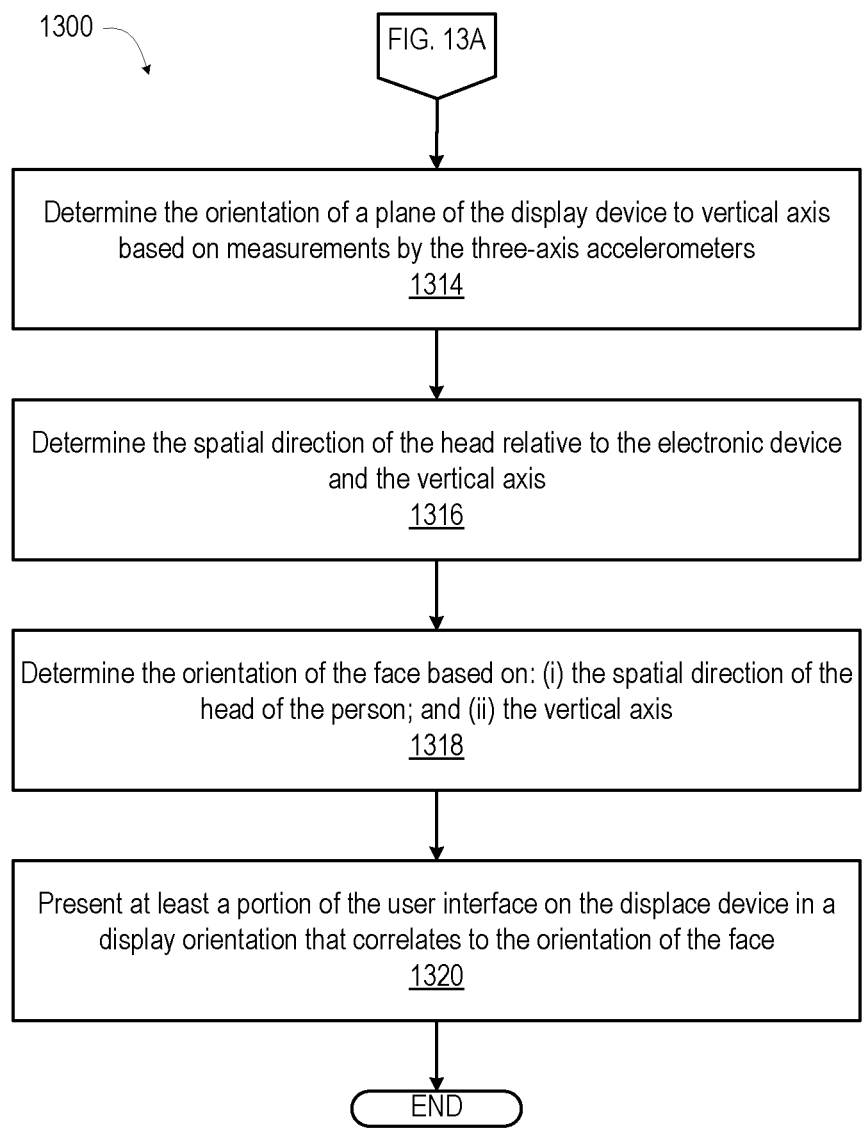

FIGS. 13A-13B present a flow diagram of method 1300 for determining facial orientation with inadequate light or with inadequate resolution for successful facial recognition. In one or more embodiments, controller 101 enables electronic device 100 (FIG. 1) to perform method 1300. With reference to FIG. 13A, method 1300 includes receiving an image captured by an image capture device of an electronic device (block 1302). Method 1300 includes performing facial recognition (block 1304). A determination is made, in decision block 1306, whether a face is identified in the image using facial recognition. In response to identifying a face in the image using facial recognition, method 1300 includes presenting at least a portion of the user interface on the display device oriented to correlate with the facial orientation (block 1308). Then method 1300 ends. In response to failing to identify a face in the image using facial recognition, method 1300 includes determining, in decision block 1310, whether a head is detected within the image. In response to failing to identify a head in the image using facial recognition, method 1300 includes presenting the user interface on the display device using the default display orientation (block 1312). Then method 1300 ends.

With reference to FIG. 13B, in response to determining that a head of a person is detected, method 1300 includes determining the orientation of a plane of the display device to vertical axis based on measurements by the three-axis accelerometers (block 1314). Method 1300 includes determining the spatial direction of the head relative to the electronic device and the vertical axis (block 1316). Method 1300 includes determining the orientation of the face based on: (i) the spatial direction of the head of the person; and (ii) the vertical axis (block 1318). Method 1300 includes presenting at least a portion of the user interface on the display device in a display orientation that correlates to the orientation of the face (block 1320). Then method 1300 ends.

In each of the above flow charts presented herein, certain steps of the methods can be combined, performed simultaneously or in a different order, or perhaps omitted, without deviating from the spirit and scope of the described innovation. While the method steps are described and illustrated in a particular sequence, use of a specific sequence of steps is not meant to imply any limitations on the innovation. Changes may be made with regards to the sequence of steps without departing from the spirit or scope of the present innovation. Use of a particular sequence is therefore, not to be taken in a limiting sense, and the scope of the present innovation is defined only by the appended claims.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic device comprising:
a display device that presents a user interface having at plurality of portions that can each be individually oriented in different orientations on the display device, the display device having a default display orientation;
an image capture device that captures an image of at least a portion of a field of regard relative to the display device;
a memory containing a display orientation application that enables one or more foreground portions of a user interface to be independently oriented to align with detected faces and presented over a background portion that is presented in the default display orientation on the display device; and
a controller communicatively coupled to the display device, the image capture device, and the memory and that executes the display orientation application, enabling the electronic device to:
receive the image captured by the image capture device;
identify a plurality of faces within the image and associating each identified face of the plurality of faces with a corresponding person viewing at least one of the plurality of portions of the user interface;
determine an orientation of each identified face relative to the default display orientation of the display device;
presents the background portion of the user interface in the default display orientation on the display device;
present at least a first foreground portion of the user interface on the display device in a first display orientation that aligns to a first orientation of a first identified face that is not aligned with and is at an offset angle from the default display orientation; and
present at least a second foreground portion of the user interface on the display device in a second display orientation that aligns to a second orientation of a second identified face that is not aligned with the default display orientation and is different from the first display orientation, wherein the first foreground portion of the user interface is oriented in a first orientation to enable viewing by the first identified face and the second foreground portion of the user interface is oriented in the second orientation to enable viewing by the second identified face.

2. The electronic device of claim 1, wherein the controller enables the electronic device to:
receive a default portion of the user interface that is associated with the default display orientation;
receive at least one other portion of the user interface, each other portion associated with a different person;
present, on the display device, the default portion of the user interface using the default display orientation; and
present, on the display device, each of the at least one other portion of the user interface in a corresponding second display orientation that respectively correlates to the orientation of the face of the associated different person.

3. The electronic device of claim 1, wherein the controller enables the electronic device to:
determine a non-perpendicular viewing angle of the face to a plane of the display device;
adjust an orientation of the user interface relative to a plane of the display device to provide a reverse perspective that compensates for the non-perpendicular viewing angle and that compensates for distortion due to off-axis viewing of the user interface; and
present the user interface on the display device with the reverse perspective.

4. The electronic device of claim 1, wherein the controller enables the electronic device to identify the at least one face within the image by determining, based on range finding by a range finder, a distance to each person and selecting, from among more than one face, a first face within each different orientation that is closest to the electronic device.

5. The electronic device of claim 1, wherein the controller enables the electronic device to:
identify each of the at least one face within the image as associated with a specific person and determine the orientation of the face relative to the orientation of the display device by performing facial recognition;
selecting, from among the plurality of persons, at least one specific person to present individually orient content;
selectively present a first foreground message within one of the one or more foreground portions of the user interface, oriented at an offset from the default display orientation to be in alignment with the face of a first specific person selected for receiving individually oriented content;
selectively presents a second foreground message within another one of the one or more foreground portions of the user interface oriented at an offset from the default display orientation to be in alignment with the face of a second specific person selected for receiving individually oriented content; and
in response to a third person among the plurality of persons not being selected for individually oriented content, presenting the background portion in the default orientation to the third person not selected for individually oriented content, wherein no foreground portion of the user interface is aligned explicitly with a face of the third person not selected for receiving individually-oriented content.

6. The electronic device of claim 5, wherein:
the electronic device comprises an axis-based motion sensor;
the controller is in communication with the axis-based motion sensor and enables the electronic device to determine an orientation of the face relative to the orientation of the display device by:
in response to failing to identify a face in the image using facial recognition, determining whether a head of a person is detected within the image;
in response to determining that the head of a person is detected:
determining the orientation of a plane of the display device to vertical axis based on measurements by the axis-based motion sensor;
determining the spatial direction of the head relative to the electronic device and the vertical axis; and
determining the orientation of the face based on: (i) the spatial direction of the head of the person; and (ii) the vertical axis.

7. The electronic device of claim 1, wherein the display device is a round display device and the controller executes the display orientation application enabling the electronic device to:
   detect a closest face at an angle relative to a vertical axis of the display device; and
   rotate the user interface on the round display device to align with the angle of the closest face.

8. A method comprising:
   receiving an image captured by an image capture device of an electronic device, the image comprising a field of regard of a display device of the electronic device;
   identifying, by a controller of the electronic device, a plurality of faces within the image and associating each identified face of the plurality of faces with a corresponding person viewing at least one of the plurality of portions of the user interface;
   determining an orientation of the face relative to a default display orientation of the display device, the display device presenting each of a plurality of portions of the user interface, including a background portion and a plurality of foreground portions that can be individually oriented on the display device to align with detected faces;
   presenting the background portion of the user interface in the default display orientation on the display device;
   presenting at least a first foreground portion of the user interface on the display device in a first display orientation that aligns to a first orientation of a first identified face and at an offset angle from the default display orientation; and
   presenting at least a second foreground portion of the user interface on the display device in a second display orientation that aligns to a second orientation of a second identified face, wherein the first foreground portion of the user interface is oriented in a first orientation to enable viewing by the first identified face and the second foreground portion of the user interface is oriented in the second orientation to enable viewing by the second identified face.

9. The method of claim 8, wherein presenting at least a portion of the user interface on the display device using the orientation of the face comprises:
   receiving a default portion of the user interface that is associated with a default display orientation;
   receiving at least one other portion of the user interface, each other portion associated with a different person;
   presenting, on the display device, the default portion of the user interface using the default display orientation; and
   presenting, on the display device, each of the at least one other portion of the user interface in a corresponding second display orientation that respectively correlates to the orientation of the face of the associated different person.

10. The method of claim 8, further comprising:
    determining a non-perpendicular viewing angle of the face to a plane of the display device;
    adjusting an orientation of the user interface relative to a plane of the display device to provide a reverse perspective that compensates for the non-perpendicular viewing angle and that compensates for distortion due to off-axis viewing of user interface; and
    presenting the user interface on the display device with the reverse perspective.

11. The method of claim 8, wherein identifying the at least one face within the image comprises: determining, based on range finding by a range finder, a distance to each person; and selecting, from among the more than one face, a first face within each different orientation that is closest to the electronic device.

12. The method of claim 8, wherein determining the orientation of the face relative to the orientation of the display device comprises:
    in response to failing to identify a face in the image using facial recognition, determining whether a head of a person is detected within the image;
    in response to determining that the head of a person is detected:
       determining the orientation of a plane of the display device to vertical axis based on measurements by the three-axis accelerometers;
       determining the spatial direction of the head relative to the electronic device and the vertical axis; and
       determining the orientation of the face based on: (i) the spatial direction of the head of the person; and (ii) the vertical axis.

13. The method of claim 8, wherein the display device is a round display device and the method further comprises:
    detecting a closest face at an angle relative to a vertical axis of the display device; and
    rotating the user interface on the round display device to align with the angle of the closest face.

14. The method of claim 8, further comprising:
    selecting, from among the plurality of persons, one or more specific person to present individually orient content;
    selectively present a first foreground message within one of the one or more foreground portions of the user interface oriented at an offset from the default display orientation to be in alignment with the face of a first specific person selected for receiving individually oriented content;
    selectively presents a second foreground message within another one of the one or more foreground portions of the user interface oriented at an offset from the default display orientation to be in alignment with the face of a second specific person selected for receiving individually oriented content; and
    in response to a third person from the plurality of persons not being selected for individually oriented content, presenting the background portion in the default orientation to the one or more persons not selected for individually oriented content, wherein no foreground portion of user interface is aligned explicitly with a face of the third person not selected for receiving individually-oriented content.

15. A computer program product comprising:
    a computer readable storage device; and
    program code on the computer readable storage device that when executed by a processor associated with an electronic device having a display device and an image capture device, the program code enables the electronic device to provide the functionality of:
       receiving an image captured by an image capture device of an electronic device, the image comprising a field of regard of the display device;
       identifying, by a controller of the electronic device, at least one face within the image and associating each identified face of the at least one face with a corresponding person viewing at least one of the plurality of portions of the user interface;
       determining an orientation of the face relative to a default display orientation of the display device, the display device presenting each of a plurality of portions of the user interface including a background portion and a plurality of foreground portions that can be individually oriented on the display device to align with detected faces;

presenting the background portion of the user interface in the default display orientation on the display device;

presenting at least a first foreground portion of the user interface on the display device in a first display orientation that aligns to a first orientation of a first identified face and is at an offset angle from the default display orientation;

presenting at least a second foreground portion of the user interface on the display device in a second display orientation that aligns to a second orientation of a second identified face, wherein the first foreground portion of the user interface is oriented in a first orientation to enable viewing by the first identified face and the second foreground portion of the user interface is oriented in the second orientation to enable viewing by the second identified face.

16. The computer program product of claim 15, wherein, in presenting at least a portion of the user interface on the display device using the orientation of the face, the program code enables the electronic device to provide the functionality of:

receiving a default portion of the user interface that is associated with a default display orientation;

receiving at least one other portion of the user interface, each other portion associated with a different person;

presenting, on the display device, the default portion of the user interface using the default display orientation; and presenting, on the display device, each of the at least one other portion of the user interface in a corresponding second display orientation that respectively correlates to the orientation of the face of the associated person.

17. The computer program product of claim 15, wherein the program code enables the electronic device to provide the functionality of:

determining a non-perpendicular viewing angle of the face to a plane of the display device;

adjusting an orientation of the user interface relative to a plane of the display device to provide a reverse perspective that compensates for the non-perpendicular viewing angle and that compensates for distortion due to off-axis viewing of user interface; and presenting the user interface on the display device with the reverse perspective.

18. The computer program product of claim 15, wherein, in identifying the at least one face within the image, the program code enables the electronic device to provide the functionality of: determining, based on range finding by a range finder, a distance to each person; and selecting from among more than one face, a first face within each different orientation that is closest to the electronic device from among faces.

19. The computer program product of claim 15, wherein, in determining the orientation of the face relative to the orientation of the display device, the program code enables the electronic device to provide the functionality of:

in response to failing to identify a face in the image using facial recognition, determining whether a head of a person is detected within the image;

in response to determining that the head of a person is detected:

determining the orientation of a plane of the display device to vertical axis based on measurements by the three-axis accelerometers;

determining the spatial direction of the head relative to the electronic device and the vertical axis; and determining the orientation of the face based on: (i) the spatial direction of the head of the person; and (ii) the vertical axis.

20. The computer program product of claim 15, wherein the program code enables the electronic device to provide the functionality of:

selecting, from among the plurality of persons, one or more specific person to present individually orient content;

selectively present a first foreground message within one of the one or more foreground portions of the user interface oriented at an offset from the default display orientation to be in alignment with the face of a first specific person selected for receiving individually oriented content;

selectively presents a second foreground message within another one of the one or more foreground portions of the user interface oriented at an offset from the default display orientation to be in alignment with the face of a second specific person selected for receiving individually oriented content; and in response to a third person from the plurality of persons not being selected for individually oriented content, presenting the background portion in the default orientation to the one or more persons not selected for individually oriented content, wherein no foreground portion of user interface is aligned explicitly with a face of the third person not selected for receiving individually-oriented content.

\* \* \* \* \*